M. L. HANAHAN.
PROCESS OF MANUFACTURING SULFURIC ACID.
APPLICATION FILED MAR. 2, 1917.
1,253,238.
Patented Jan. 15, 1918.
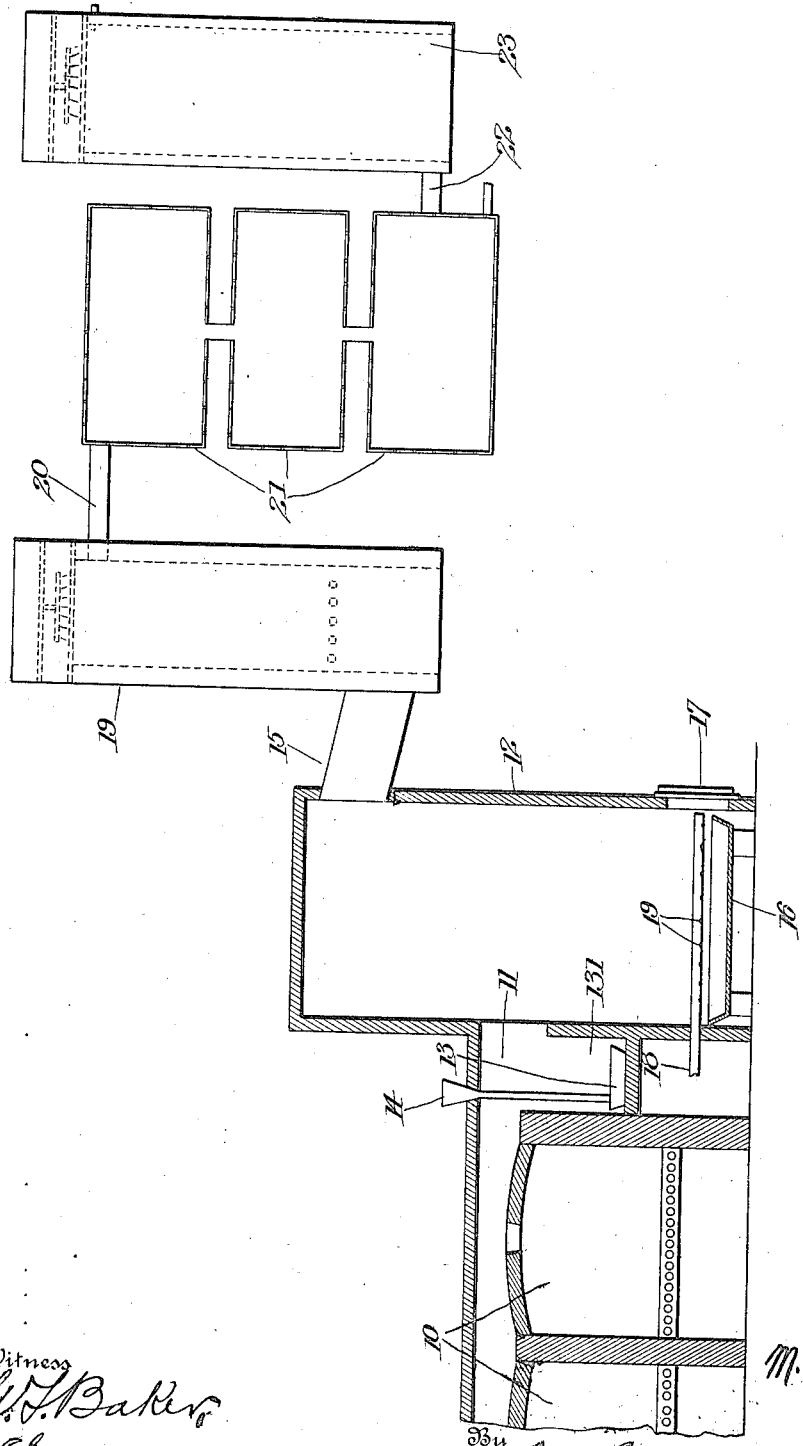

UNITED STATES PATENT OFFICE.

MARION L. HANAHAN, OF DOTHAN, ALABAMA.

PROCESS OF MANUFACTURING SULFURIC ACID.

1,253,238.   Specification of Letters Patent.   Patented Jan. 15, 1918.

Application filed March 2, 1917. Serial No. 152,114.

*To all whom it may concern:*

Be it known that I, MARION L. HANAHAN, a citizen of the United States, residing at Dothan, in the county of Houston and State of Alabama, have invented certain new and useful Improvements in Processes of Manufacturing Sulfuric Acid, of which the following is a description.

My invention relates to the manufacture of sulfuric acid and has particular reference to an improvement for increasing the capacity of a given sulfuric acid manufacturing plant by increasing the density of the sulfur dioxid which enters into the manufacture of the sulfuric acid.

It has been attempted heretofore to increase the capacity of sulfuric acid plants and the lead chambers thereof but all patented methods of which I am aware are complicated and are also expensive to install and operate. My object has, therefore, been to obtain a greater capacity for a given sulfuric acid plant with the least possible expense for reconstruction and for maintaining the same after the improvement is installed.

The above and other objects and the novel features of my invention will be apparent from the following description taken in connection with the drawing which forms a part of this application.

The drawing is a diagrammatic representation of a portion of a sulfuric acid manufacturing plant embodying my invention.

Referring to the drawing, 10 represents one of a battery of pyrites furnaces or roasters in which sulfur bearing or pyrites ores are roasted or smelted to produce sulfur gases, principally sulfur dioxid. The ore furnace or pyrites roaster 10 may be of any ordinary or preferred construction, the one shown being intended to designate a "lump" pyrites burner but it is to be understood that pyrites "fines" burners and furnaces for roasting sulfur bearing ores may also be employed. The pyrites burners are lined with fire brick and the gas chamber in the top thereof is connected by a flue 11 to a dust chamber 12. The niter oven 131 below the flue 11 contains one or more niter pots 13 which are of metal and adapted to hold nitrate of soda. A cast iron funnel 14 is mounted on the flue 11 and through it nitrate of soda may be readily poured into said niter pot or pots. By means of the funnel 14, I am able to feed the extra sodium nitrate needed to go along with the excess of sulfur gases produced in the dust chamber to be described. The flue 11 enters the dust chamber at a point about midway between the top and bottom thereof, and the dust chamber has an outlet near its upper end which opens into a flue 15.

A cast iron shallow pan or container 16 is supported on the floor near the bottom of the dust chamber 12. This pan 16 is designed to hold commercial sulfur when the same becomes molten and is burning. The commercial sulfur is charged in the pan 16 through a door 17, cut in the side of the dust chamber opposite the sulfur container 16. An air pipe 18 extends through the wall of the dust chamber and over the pan 16 and has one or more openings 19 to supply air or oxygen under pressure in close proximity to the sulfur in the pan 16. This oxygen or air is necessary to support the combustion of the sulfur in the pan 16 to provide the sulfur dioxid. The heat necessary for melting and burning the sulfur in the pan 16 is derived from the heat of the gases entering the dust chamber 12 from the pyrites roaster 10. The sulfur dioxid produced by the burning of the sulfur in the pan 16 in the presence of air supplied by the pipe 18 rises and commingles with the sulfur dioxid entering the dust chamber from the pyrites roaster and the excess sodium nitrate carried by the latter gas is sufficient for the additional sulfur dioxid produced by the burning sulfur in the pan 16.

The commingled sulfur dioxid from the pyrites roaster and from the burning sulfur in the pan 16 pass through the flue 15 into the Glover tower 19, where they are subjected to the usual treatment of a Glover tower. From the Glover tower 19, the gases pass through the flue 20 into the lead chambers 21 where the gases are condensed into sulfuric acid in the usual way. The products to be recovered pass through the flue 22 into the Gay Lussac tower 23.

It will be seen that I have provided an apparatus and method by means of which the sulfur dioxid gases entering the Glover tower may be greatly enriched so that the lead chambers 21 will be worked at a greater density and the amount of sulfuric acid condensed will be increased without increasing the cubic space required for lead chambers. This increase in lead chamber capacity is obtained with or without using intensifiers or other systems between the chambers. It will, of course, be possible to use more than one lead chamber where desired.

The simplicity of my arrangement is a very important consideration. A dust chamber is usually provided for settling the dust coming from the pyrites roasters with the sulfur dioxid gases to prevent clogging of the Glover tower. It is only necessary to cut an opening in the side wall of such a dust chamber so that sulfur can be readily charged into the sulfur container inside the chamber. In addition to the doorway and sulfur container, an air inlet pipe is provided and by these simple changes I find it possible to obtain very advantageous results with but little expense and no reconstruction. It will be obvious that the expense of altering the dust chamber to render it capable of carrying out my process is comparatively small. Furthermore, no additional furnace or burner is necessary to heat the sulfur in the dust chamber and burn it since the hot gases entering the dust chamber from the pyrites roaster are of such a high temperature that the sulfur in the pan 16 will be readily melted and converted into sulfur dioxid in the presence of the air forced into the dust chamber through the pipe 18.

While I have shown and described my method and apparatus for working it in detail, it is to be understood that the type of pyrites burner and other parts of the apparatus may be varied without departing from the spirit of the invention.

Having described the invention, what is claimed and desired to be secured by Letters Patent is:

1. In an apparatus for use in the manufacture of sulfuric acid, the combination with a pyrites furnace or roaster, of a dust chamber communicating therewith and means for burning sulfur or similar material in said dust chamber adapted to produce sulfur gases.

2. In an apparatus for use in the manufacture of sulfuric acid, the combination with a pyrites furnace or roaster, of a dust chamber communicating therewith, a container in said dust chamber for holding sulfur or similar material adapted to produce sulfur gases when heated, and means for delivering oxygen or air to the dust chamber in proximity to said container.

3. In an apparatus for use in the manufacture of sulfuric acid, the combination with a pyrites furnace or roaster, of a dust chamber communicating therewith, a container near the bottom of said dust chamber adapted to hold commercial sulfur, an opening in the dust chamber through which sulfur may be charged into said container, and an air pipe extending into said dust chamber and having one or more openings therein adapted to deliver air in proximity to the sulfur in said container.

4. In an apparatus for use in the manufacture of sulfuric acid, the combination with a pyrites roaster, of a dust chamber having an inlet intermediate its upper and lower ends communicating with said pyrites roaster, said dust chamber also having an outlet near its upper end, a container near the bottom of said dust chamber adapted to hold commercial sulfur to be burned in said dust chamber by the heat of the gases entering said dust chamber from said pyrites roaster, said dust chamber having an opening therein through which sulfur may be charged into said sulfur container, and an air pipe extending into said dust chamber above the sulfur container and having one or more outlet openings in proximity to the sulfur in said container to promote the combustion of the sulfur and the production of sulfur dioxid.

In testimony whereof I affix my signature.

MARION L. HANAHAN.